US008035673B2

(12) United States Patent
Yoon et al.

(10) Patent No.: US 8,035,673 B2

(45) Date of Patent: Oct. 11, 2011

(54) SYSTEM AND METHOD FOR FILM WATERMARKING

(75) Inventors: Youngshik Yoon, Valencia, CA (US); Ion Vizireanu, Westlake Village, CA (US); Mike Arthur Derrenberger, Hopkinton, MA (US); Margit Elisabeth Elo, Pasadena, CA (US); Sek Loong Chai, Santa Clarita, CA (US); Joachim Knittel, Villingen-Schwenningen (DE); David Gilmartin, Chino Hills, CA (US); Bill Hogue, Simi Valley, CA (US); Fabian Pinto, Sherman Oaks, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 563 days.

(21) Appl. No.: 11/922,643

(22) PCT Filed: Dec. 6, 2005

(86) PCT No.: PCT/US2005/043827

§ 371 (c)(1), (2), (4) Date: Dec. 20, 2007

(87) PCT Pub. No.: WO2007/005052

PCT Pub. Date: Jan. 11, 2007

(65) Prior Publication Data

US 2009/0079809 A1 Mar. 26, 2009

Related U.S. Application Data

(60) Provisional application No. 60/694,832, filed on Jun. 29, 2005.

(51) Int. Cl.

| | |
|---|---|
| *B41J 2/435* | (2006.01) |
| *G01D 15/14* | (2006.01) |
| *B42D 15/00* | (2006.01) |
| *B42D 15/10* | (2006.01) |
| *H04N 1/40* | (2006.01) |

(52) U.S. Cl. .......... 347/224; 283/72; 283/113; 358/3.28

(58) Field of Classification Search .................. 283/113

See application file for complete search history.

(56) References Cited

U.S. PATENT DOCUMENTS 5,075,716 A * 12/1991 Jehan et al. ...................... 355/1

5,093,684 A 3/1992 Crochetierre et al.

(Continued)

OTHER PUBLICATIONS

"Thomson Provides Studios Assistance with Security Services on VHS and DVD Screeners for 2003 Academy Award Season", Business Wire, Feb. 16, 2004, Paris & Camarillo, CA (2 pages).

(Continued)

*Primary Examiner* — Uyen Chau N Le

*Assistant Examiner* — John M Bedtelyon

(74) *Attorney, Agent, or Firm* — Robert D. Shedd; Robert B. Levy; Jeffrey D. Hale

(57) ABSTRACT

A system and method for watermarking a film includes a light source array including one or more light sources having light directed toward a film to be watermarked. A control mechanism is configured to synchronize a position of the film with the light sources such that the light sources are activated to record a watermark on the film to identify an aspect of the film, wherein the watermark includes a plurality of spots aligned transversely to a direction of film motion during printing of the film.

27 Claims, 4 Drawing Sheets

U.S. PATENT DOCUMENTS

| | | | | |
|---|---|---|---|---|
| 5,799,029 | A * | 8/1998 | Rossi et al. | 372/50.23 |
| 6,263,086 | B1 | 7/2001 | Wang | |
| 6,407,767 | B1 * | 6/2002 | Klees et al. | 347/241 |
| 6,480,220 | B1 * | 11/2002 | Tamaki | 347/242 |
| 6,535,271 | B1 * | 3/2003 | Ogasawara | 355/37 |
| 6,556,273 | B1 * | 4/2003 | Wheeler et al. | 352/92 |
| 6,809,792 | B1 | 10/2004 | Tehranchi et al. | |
| 6,882,356 | B2 * | 4/2005 | Roddy et al. | 347/224 |
| 6,930,759 | B2 | 8/2005 | Roddy et al. | |
| 6,980,226 | B2 * | 12/2005 | Jones et al. | 347/225 |
| 7,206,409 | B2 * | 4/2007 | Antonellis et al. | 380/202 |
| 7,221,383 | B2 * | 5/2007 | MacKenzie et al. | 347/251 |
| 7,289,644 | B2 * | 10/2007 | Duffield et al. | 382/100 |
| 7,623,661 | B2 * | 11/2009 | Clark et al. | 380/201 |
| 2002/0126871 | A1 | 9/2002 | Hannigan et al. | |
| 2004/0125125 | A1 | 7/2004 | Levy | |
| 2004/0223612 | A1 | 11/2004 | Kamijoh et al. | |
| 2006/0049262 | A1 | 3/2006 | Elo et al. | |

OTHER PUBLICATIONS

Search report dated Aug. 18, 2006.

* cited by examiner

SYSTEM AND METHOD FOR FILM WATERMARKING

RELATED APPLICATION DATA

This application claims the benefit, under 35 U.S.C. §365 of International Application PCT/US2005/043827, filed Dec. 6, 2005, which was published in accordance with PCT Article 21(2) on Jan. 11, 2007 in English and which claims the benefit of United States provisional patent application No. 60/694, 832, filed Jun. 29, 2005.

FIELD OF THE INVENTION

The present invention generally relates to systems and methods to guard against illegal piracy in copying of films and, more particularly, to film watermarking systems and methods for marking films for identification in a manner undetectable to viewers and pirates.

BACKGROUND OF THE INVENTION

Improvements in camera capture technology have increased the ability for individuals to illegally reproduce film content. Illegal film copying (piracy) has resulted in substantial losses in profit to film makers and studios since the films that are produced can be illegally marketed using the advanced camera capture technology.

Once illegal copies of a title are released, there is no evidence of where the film was originally recorded. Attempts to remedy this include making small holes or marking dots into the film in a manual manner to provide an identity of the original film. However, these techniques are not useful in tracing illegal copy piracy. Further, such methods are time-consuming and inefficient, as these methods require a great deal of labor and cost. In addition, pirates are able to remove such marking digitally from the films.

Referring to FIG. 1, a schematic drawing of a typical film printing machine 10 is shown. In the printing machine 10, a film 12 is processed to add images and sound thereto. A plurality of motors 14 (labeled M1 through M7) are employed to advance the film 12 through different processes. A raw stock reel (varying in size) includes blank film. The raw stock is advanced to a picture printing head 18 and video images are copied to the raw stock by a master negative 22. Next, sound is applied to the film 12 at a sound track printing head 20.

A motor 14 (M7) is a main drive motor that drives picture and sound heads by coupling the head with a timing belt 15. Tensioning devices are not shown for simplicity. In fact, such tension arms are used to provide constant speed and steadiness during the printing process. As shown in FIG. 1, the film is not marked during printing. Instead, a separate process would be needed to place visible markings on the film, which requires making holes or marking dots into the film in a manual manner. Such a process is inefficient and not cost-effective.

SUMMARY OF THE INVENTION

A system and method for watermarking a film includes a light source array including one or more light sources having light directed toward a film to be watermarked. A control mechanism is configured to synchronize a position of the film with the light sources such that the light sources are activated to record a watermark on the film to identify an aspect of the film.

A system for watermarking a film includes a watermark device having a light source array including one or more light sources which are configured to direct light toward a film to be watermarked. A securing device is configured to secure a one or more optical fibers in positions to form a pattern on the film to be watermarked, the optical fibers guiding light from the light sources to the film. A control mechanism is configured to synchronize a position of the film with the light sources such that the light sources are activated to record a watermark on the film to identify an aspect of the film, wherein the watermark includes a plurality of spots aligned transversely to a direction of film motion during printing of the film.

A method for watermarking a film includes providing, in a film printing system, a watermarking device having a light source array including one or more light sources having light directed toward a film to be watermarked and a control mechanism for synchronization, and synchronizing a position of the film with the light sources using the control mechanism such that the light sources are activated to record a watermark on the film to identify an aspect of the film, wherein the watermark includes a plurality of spots aligned transversely to a direction of film motion during printing of the film.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily the only possible configuration for illustrating the invention.

DETAILED DESCRIPTION OF THE INVENTION

The present invention provides a system and method for adding a watermark or other indicia to a film. In a preferred embodiment, the indicia are added during the printing process and are performed simultaneously therewith. The indicia are used to track and forensically trace the origination of illegal pirate copies of the film or to otherwise authenticate the film.

The present invention may individually mark a non-perforated area of film (e.g., an edge or perf area) to introduce a serialized identity number, logo or other mark. Furthermore, these technologies meet stringent requirements from creative producers and cinema-going audience to avoid any visible changes to the image and to minimize discomfort through techniques like color management. By the present invention, watermarking indicates where a film was recorded and provides a starting point to track the film.

It is to be understood that the present invention is described in terms of a video recording or printing system; however, the present invention is much broader and may include any digital multimedia transfer, recording or duplication system, which is capable of printing copying or marking a media. The present invention is described in terms of watermarking films; however, the concepts of the present invention may be extended to light or sound sensitive media.

It should be understood that the elements shown in the FIGS. may be implemented in various forms of hardware, software or combinations thereof. Preferably, these elements are implemented in hardware with operations or functions performed by software on one or more appropriately programmed general-purpose devices, which may include a processor, memory and input/output interfaces.

Figure 1:
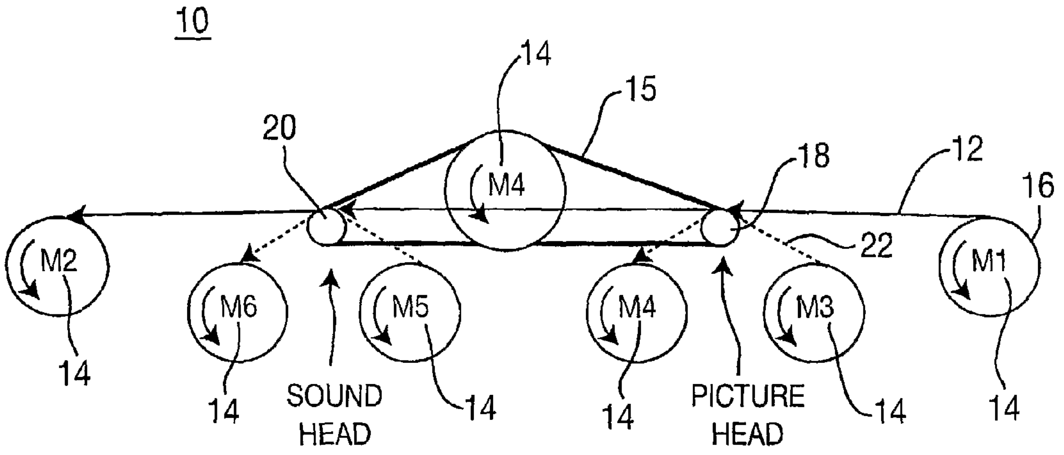
FIG. 1 PRIOR ART
FIG. 1 is schematic diagram of a prior art film printing machine.
Figure 2:
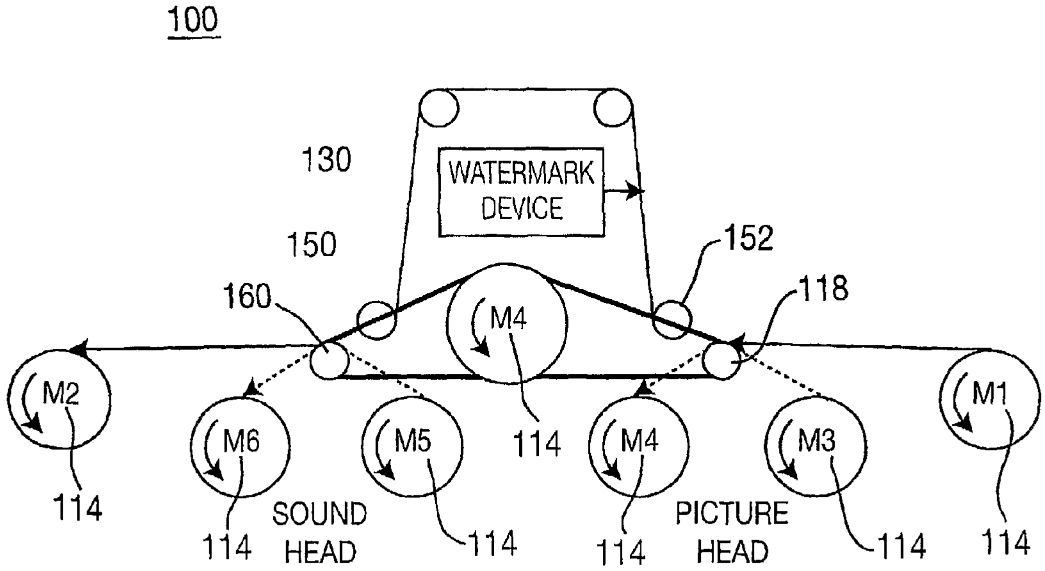
FIG. 2 is schematic diagram showing an exemplary system for watermarking a film during printing in accordance with one embodiment of the present invention.

Referring now in specific detail to the drawings in which like reference numerals identify similar or identical elements throughout the several views, and initially to FIG. 2, a schematic drawing of a film printing machine 100 is illustratively shown in accordance with an exemplary embodiment of the present invention. Printing machine 100 processes a film or magnetic tape 112 to record images, sound or both to the film. A plurality of motors 114 (labeled M1 through M7) are employed to advance the film 112 through different processes. A raw stock reel 116 includes blank film or magnetic tape. The raw stock film is advanced to an encoder 118 and video or still images are copied to the raw stock by a master negative 122.

Figure 3:
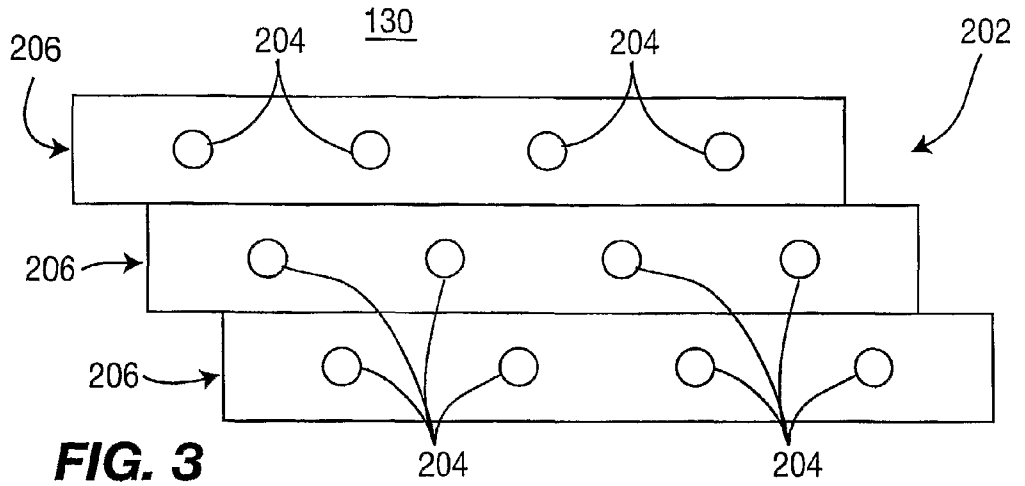
FIG. 3 is a front view of a laser/diode array in accordance with one illustrative embodiment; block.

After images are recorded on film 112, a watermarking illumination device 130 is employed to record markings on the film 112. In the embodiment shown, device 130 includes an array of lasers or light emitting diodes to provide a marking pattern. Referring to FIG. 3, in one embodiment, an array 202 of sources 204 is employed by device 130 to illuminate a pattern on film 112. The sources 204 may include lasers or diodes which are intermittently pulsed to cause a marking pattern to be printed on the film 112. It is to be understood that the laser or diode sources 204 may be marked on the film at the same time or at different times during the printing process. The film 112 passes in front of the array of sources shown in FIG. 3. Preferably the markings are added after the images are recorded on the film 112. As shown in FIG. 3, the laser/diode array 202 includes three tiers 206 each tier having multiple sources 204 (four sources on each tier are illustratively shown). There may be more tiers 206 or only one tier to provide a desired watermark on the film 112.

Figure 4:
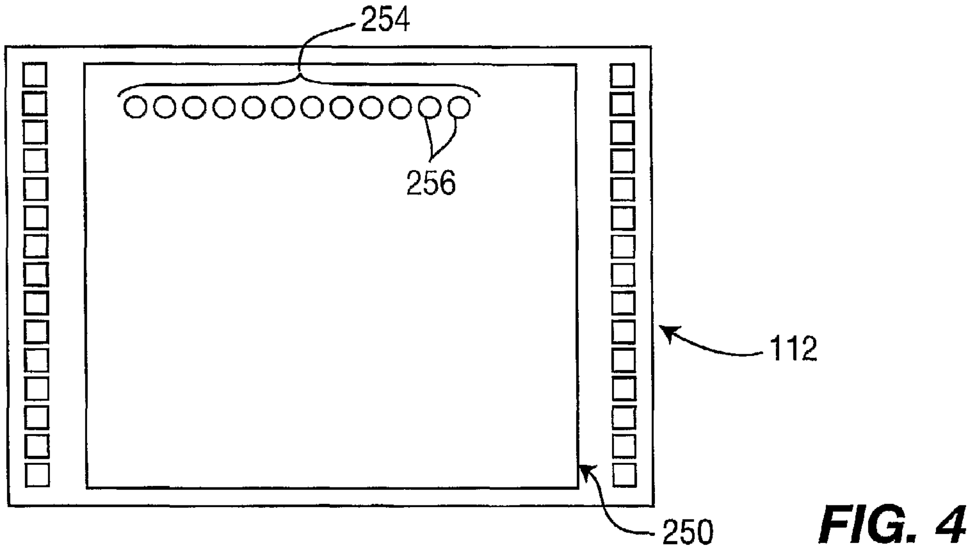
FIG. 4 shows an illustrative frame from a film having a watermark formed thereon in accordance with an illustrative embodiment of the present invention.

As the film 112 is advanced, the sources 204 are illuminated to cause the film to be marked. Illuminated portions 256 caused by device 130 are illustratively shown in FIG. 4. FIG. 4 indicates a frame 250 of a film 112 having a watermarked pattern 254 formed thereon. The watermarked pattern 254 may include a line of dots 256 or may include any other arrangement of dots. It is noted that these dots are preferably placed in a same area in frames of the film. For example, the dots may be aligned in a direction transverse to the film motion during the printing process.

In addition, illumination sources 202 may be angled to present an elongated or elliptical shaped dot pattern to further indicate a unique pattern. Further, the focusing lens for the illumination source may be altered in other ways to produce different shapes or effects in the marking pattern. The patterns placed on the film 112 may be in every frame or at any predetermined frequency. The frequency of the pattern per number of frames may also be indicative of the film maker or identify the origin of the film. For example, studio A may employ four dots spaced equidistant from each other is a square form while studio B uses a diagonal line with 5 dots, studio C uses two ellipses made by angling two laser sources relative to the film, studio D may place two dots any every tenth frame, studio E may move a single dot in a predetermined way across the frames (e.g., frame 1 has a dot in a first position while in frame 10 the dot is moved to a second position, then the movement pattern can be repeated), etc.

It is also to be understood that other characteristics may be provided in the watermarking pattern, e.g., color patterns or characters may be added. In one embodiment, different colored diodes may be employed to discolor the film slightly in accordance with a predetermined pattern.

Referring again to FIG. 2, the film 112 is passed over an encoder 150 and returned to the normal printing path to add sound. Film 112 is handled using rollers 152 to route the film through the watermarking device 130 and maintain the appropriate film speed and tension for the film printing process. A control mechanism may be included in device 130 to activate the sources at an appropriate film position. The control mechanism may employ information received from encoders or motors regarding the film speed or position and determine appropriate times to activate sources (e.g., using a light gate or shutter) to permit light to watermark the film. It is advantageous to employ all sources at once to form the watermark, and/or time the pulses to achieve a spot pattern.

Sound is applied to the film at the sound printing head 160. Tensioning devices are not shown for simplicity. In fact, such tension arms are employed to maintain film speed throughout the process.

Advantageously, methods of the present invention make watermarks onto the film 112 at the same time as printing on the raw stock. One difficulty includes the need to reroute the film during the process to place watermarks on the film. Device 130 may be bulky size due to optics for beam collimation (which may need multiple tiers). These tiers may cause issues in providing the watermark due to synchronization issues with the illumination 202 array with the film speed(s).

Synchronization issues may be addressed in a plurality of ways. These include providing a highly reliable film speed mechanism, synchronizing the watermark to be provided in a single instant or step to circumvent synchronization concerns, stop the film to make the watermarks, etc. In one particularly useful embodiment, synchronization issues may be solved by using collimated light and a plurality of mirrors, pulsing the sources, etc.

Figure 5:
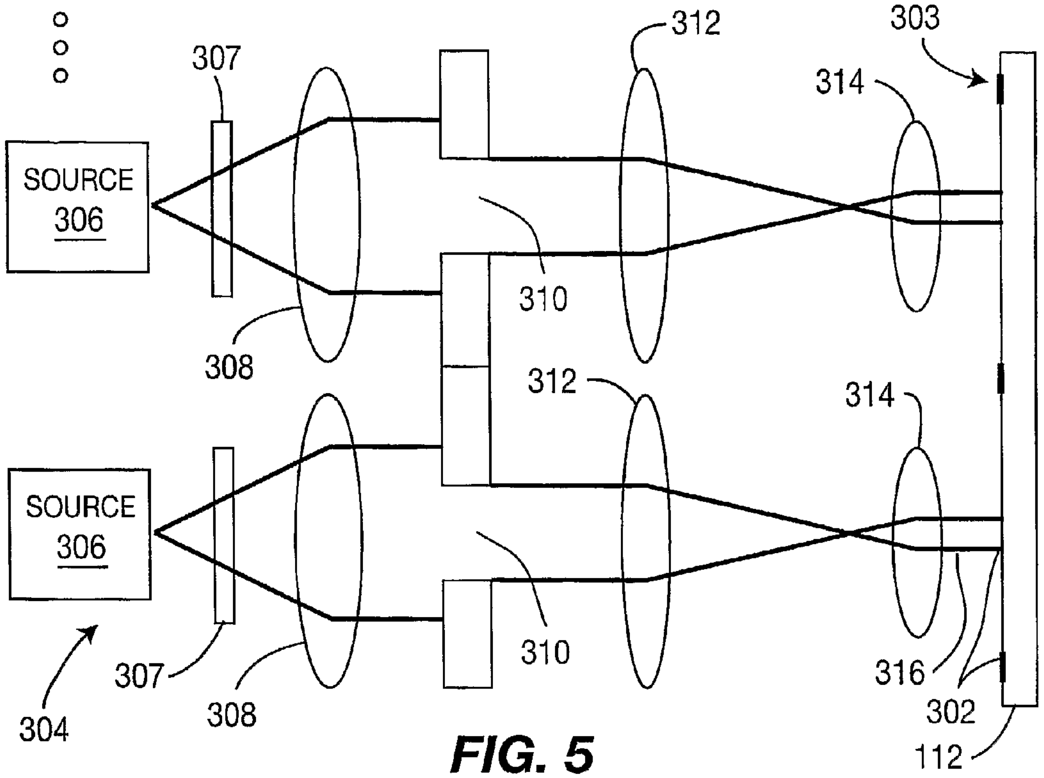
FIG. 5 illustratively depicts an optical setup to provide light on a film for watermarking the film using two positive lenses in accordance with an illustrative embodiment.

Referring to FIG. 5, device 130 may include an optical setup that provides a plurality of dots or features 302 at a same time to reduce the synchronization issues. A laser or diode array 304 includes a plurality of laser or diode sources 306. Each laser or diode 306 may include a shutter 307 or a power switch to gate light therefrom. In preferred embodiment, electrically controlled shutters 307 are employed to gate light pulses for watermarking the film. Light from the sources 306 is expanded with a beam expander 308 and filtered with a pin hole filter 310. Light from the source 306 is collimated by lens 308 and sent through a pinhole. Sources may be pulsed by other means as well.

The positive lenses 312 and 314 image the pinhole onto the film 112, thereby reducing diffractive effects (rings, etc.) on the film 112 that would otherwise be created by the pinhole 310. The spot size on the film is given by the diameter of the pinhole times the focal length of lens 314 and divided by the focal length of lens 312.

To achieve the described effect the distance between pinhole 310 and lens 312 has to be close to the focal length of lens 312, the distance between lens 312 and lens 314 has to be close to the sum of the focal lengths of lenses 312 and 314, and the distance between lens 314 and film 112 has to be close to the focal length of 314.

A further advantage of the described optical system is the relatively large focal depth (no precise positioning of 112 necessary) compared to a set-up, where the beam would be directly focused on, e.g., an optical disc. Mirrors or other optical devices may be employed to direct light in accordance with a predetermined pattern or to satisfy placement requirements for the light beam.

A spot pattern 303 is formed which can be applied on the film 112 to provide watermarking in accordance with the present invention. Each beam 316 is preferably controlled to ensure that the beam arrives on the film at the same time as the other beams 316. The spot pattern 303 may be placed in a row or other pattern. Collimated light is assumed to provide a satisfactory result; however, beam diversion over a long distance may be an issue. In another words, the spot size on the film would be different if the beam is not perfectly collimated due to diverging angle and different optical path. This is satisfactory if this is repeatable as a watermark pattern. Effort to reduce a distance between spots using folding mirrors may be employed. This may be provided using an appropriate shutter mechanism and controller (not shown).

Figure 6:
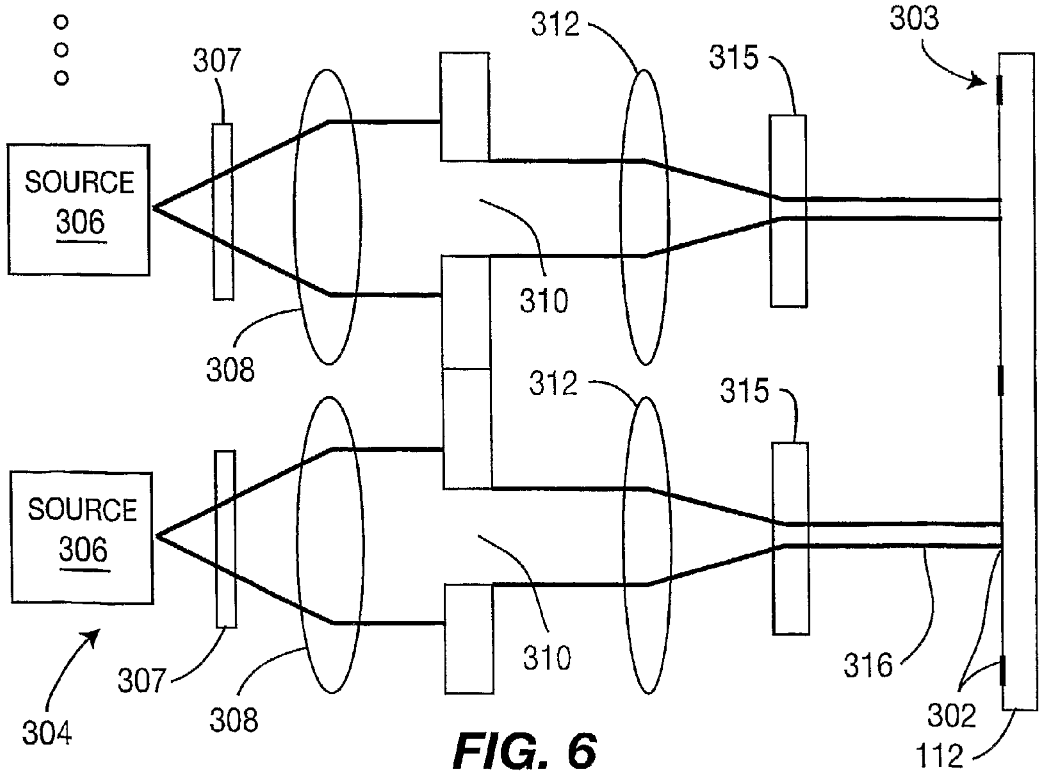
FIG. 6 illustratively depicts an optical setup to provide light on a film for watermarking the film using a positive lens and a negative lens in accordance with an illustrative embodiment.

Referring to FIG. 6, device 130 may include a laser or diode array 304 having a plurality of laser or diode sources 306. Each laser or diode 306 may include a shutter or a power switch to gate light therefrom. In this embodiment, a positive lens 312 and negative lens 315 collimate a beam 316 of light toward a film 112. A spot pattern 303 is formed which can be applied on the film 112 to provide watermarking in accordance with the present invention.

Each beam 316 is preferably controlled to ensure that the beam arrives on the film at the same time as the other beams 316. The spot pattern 303 may be placed in a row or other pattern. Collimated light is assumed to provide a satisfactory result; however, beam diversion over a long distance may be an issue. In another words, the spot size on the film would be different if the beam is not perfectly collimated due to diverging angle and different optical path. This is satisfactory if this is repeatable as a watermark pattern. Effort to reduce a distance between spots using folding mirrors needs synchronization between light sources. This may be provided using an appropriate shutter mechanism and controller (not shown).

Figure 7:
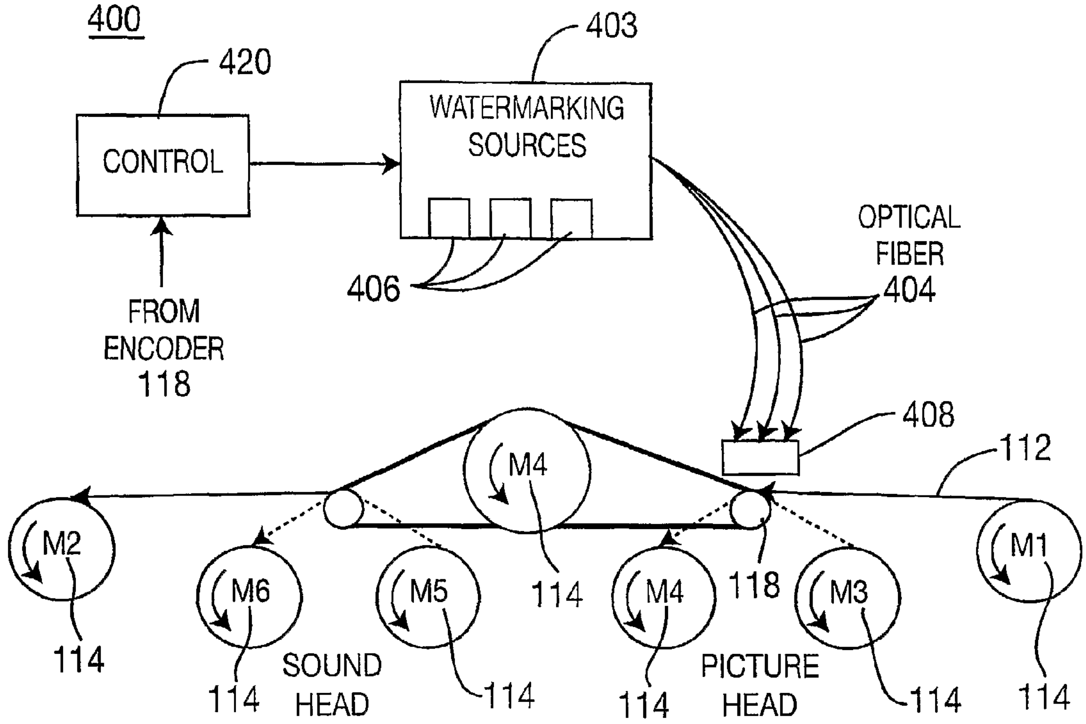
FIG. 7 is schematic diagram showing an exemplary system for watermarking a film during printing using fiber optics in accordance with one embodiment of the present invention.

Referring to FIG. 7, an alternate embodiment or the present invention is illustratively shown. In this embodiment, a film printing device 400 includes a watermarking device 403 that includes optical fibers 404. Optical fibers 404 are coupled to light sources, which may include lasers or diodes. Light sources 406 are housed in watermarking device 403 and deliver synchronized pulses to watermark film 112. Synchronization of sources 406 is preferably maintained using a control mechanism or device 420. Control mechanism 420 synchronizes the rolling of the film and the activation of sources or a shutter or shutters controlling sources to provide appropriate placement and frequency of placement of the watermark pattern on the film. In one embodiment, an optical fiber 404 may be employed as a sensor to determine when to activate sources 406 in accordance with a position of the film or a feature sensed on the film, e.g., count a number of frames or length of film that has passed. Alternately, information may be input to control 420 by encoder 118 or other device to synchronize the film position and the activation of the sources 406.

Device 403 may be maintained remotely from the printing device 400, and is therefore not limited in size or its location. Lights source 406 may be activated simultaneously to permit the entire watermarking pattern to be provided at the same time. The optical fibers 404 may be routed through other machinery or obstacles to arrive at a chuck or other securing device 408.

Figure 8:
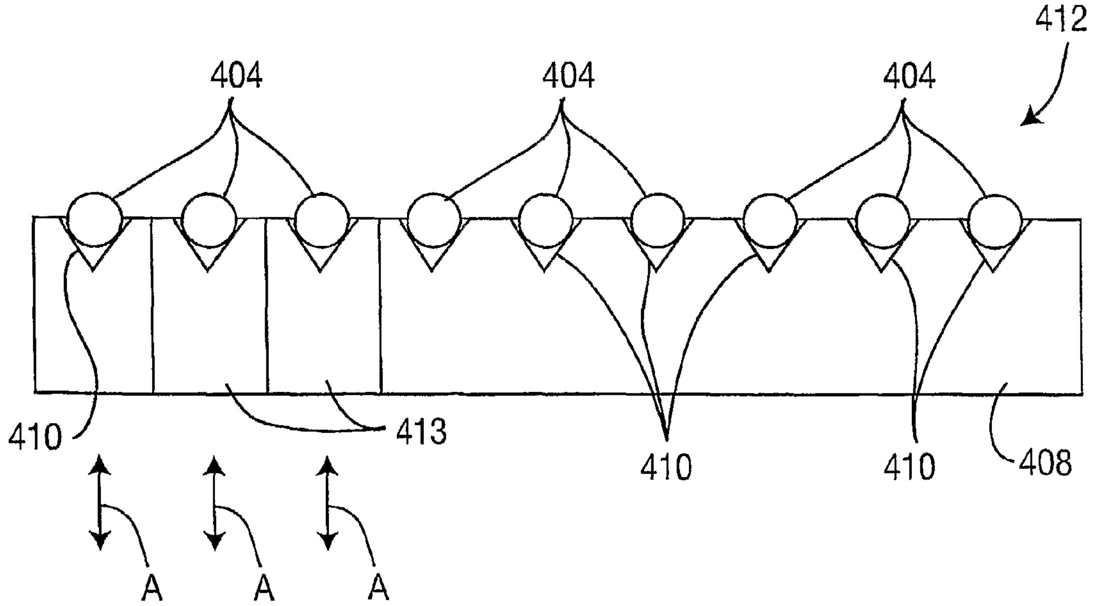
FIG. 8 is front view of a securing mechanism using for securing and moving optical fibers in accordance with an illustrative embodiment.

Chuck 408 may include a plurality of v-grooves dimensioned and configured to secure optical fibers 404 therein. The v-grooves may be offset from each other in one or more dimensions to provide a somewhat unique pattern or orientation of features of the watermarking pattern recorded on the film 112. The fibers 404 may be secured in the v-grooves using epoxy or other adhesives, or may be secured by an appropriately dimensioned and surfaced clamping device. FIG. 8 shows an illustrative fiber optic array 412 having fibers 404 in v-grooves 410 of a chuck or securing mechanism 408. Parts 413 of the securing mechanism 408 may be configurable to permit different watermark patterns (e.g., by shifting fibers up or down relative to each other in the directions of arrows "A"). Other fiber securing mechanisms may also be employed and different fiber configuration and securing device motions may be employed.

Advantageously, the fiber array permits higher dimensions for watermarking. More dots or spots can be placed in a film's frame concurrently. Since the fiber's flexibility enables a light source box or watermarking device 403 to be placed anywhere and not necessarily next to the printer 400, the overall size of printing machine is not significantly impacted. Further, by putting the fiber array close to the printing head, synchronization becomes much easier to handle as synchronization only needs the film speed through and encoder 118. In addition, such flexibility can provide another opportunity of coding in the perf area to sort out a bunch of films for cinema owners, for example.

Figure 9:
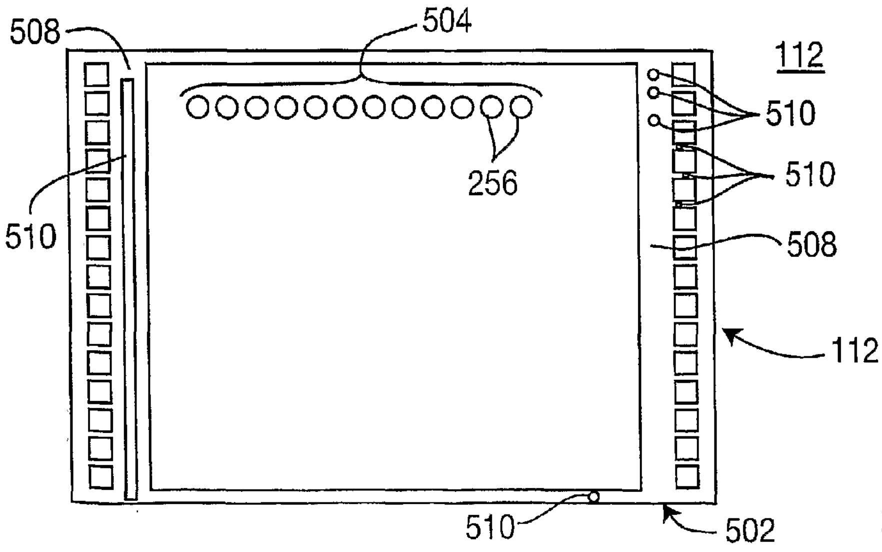
FIG. 9 is a film frame showing watermarks in the perf area.

Referring to FIG. 9, a film frame 502 is shown having a watermarking pattern 504 in a frame area 506 (where an image is recorded). In addition a perforated (perf) area 508 includes a marking or markings 510 which may include one or more stripes, characters, symbols or other markings. Marking the perf area 508 gives a highly visible making for an individual inspecting the film, but invisible to a movie viewer or a pirate that copies the film. Marking 510 may be employed to identify or authenticate the film or tape. Markings 510 may be between perforations in the film, areas around the perforations or in areas between frames of the film.

It is to be understood that the watermarking embodiments described herein are for illustrative purposes. The watermarking methods may be designed to provide patterns which symbolize a movie studio, printing company, or other entity. Using a number of features, spots, patterns, shapes, symbols and colors, many entities may be indicated on a film which would be invisible to observers, movie viewers and pirates. Light illumination of the film may provide tiny spots symbols or color differences in an area of the frames of a film. LEDs may be employed as a light source preferably instead of lasers to provide a variety of colors for watermarking and a cost advantage (diodes are cheaper and easier to maintain than lasers).

Therefore, in addition to two dimensional coding in x and y directions and color LEDs, more than 3 dimensional coding may be available. Perf area markings provide additional dimensionality for watermarking as well. Invisible watermarking can be made with slightly different color value such that without specially designed precision devices, a pirate cannot distinguish the watermarks from the visual content. An audience can see the film without perception of the watermarkings, and the watermarking makes it easier to track down illegal pirates as they cannot recognize the watermarkings and remove them. This may be implemented by low exposure power for the light sources of the present invention, which may be applied in hidden areas of a frame. In another implementation, the watermarks are applied to slightly discolor a pattern into the frame area.

Details of the individual components making up the system may be combined or mixed in a way to achieve the desired results of the present invention. For example, diodes and lasers may be mixed in a single array of sources, etc.

Having described preferred embodiments for system and method for film watermarking (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

The invention claimed is:

1. An apparatus for watermarking a film, the apparatus having at least one roller for routing the film through the apparatus, the apparatus comprising:

at least one light source comprising a plurality of optical fibers for directing light toward a film to be watermarked;

a device for securing respective portions of the plurality of optical fibers proximal to the film, the device having at least a configurable portion that emits at least some of the respective portions of at least some of the plurality of optical fibers to shift relative to each other in a direction that is transverse to a longitudinal direction of the at least some of the respective portions in order to obtain varying watermark patterns on the film; and a controller for synchronizing an activation of the at least one light source with a rolling of the film performed by at least one of the at least one roller so that the at least one light source is activated to record a watermark on the film to identify an aspect of the film, the watermark including a plurality of spots on the film.

2. The apparatus as recited in claim 1, wherein the at least one light source is part of alight source array that includes one of lasers and diodes.

3. The apparatus as recited in claim 2, wherein the light source array includes collimated light beams directed using a pin hole and two positive lenses.

4. The apparatus as recited in claim 2, wherein the light source array directs light to form a pattern on the film such that the pattern identifies the aspect of the film.

5. The apparatus as recited in claim 2, wherein the aspect of the film includes an origin of the film.

6. The apparatus as recited in claim 2, wherein the aspect of the film includes an identity of a maker of the film.

7. The apparatus as recited in claim 1, further comprising a plurality of the light source that includes color diodes, and colors of the diodes are employed as a feature of the watermark.

8. The apparatus as recited in claim 1, wherein the controller includes a encoder to synchronize a position of the film (112) with the light sources.

9. The apparatus as recited in claim 1, wherein the controller includes a shutter to activate the light sources.

10. The apparatus as recited in claim 1, wherein the watermark is placed in an area around perforation on the film.

11. The apparatus as recited in claim 1, wherein at least one of the plurality of optical fibers is used as a sensor to determine when to active the at least one light source in accordance with a position of the film.

12. The apparatus as recited in claim 1, wherein at least one of the plurality of optical fibers is used as a sensor to determine when to active the at least one light source in accordance with a feature sensed on the film.

13. The apparatus as recited in claim 12, wherein the feature comprises at least one of a count of a number of frames that have passed the at least one of the plurality of optical fibers or a length of the film that has passed the at least one of the plurality of optical fibers.

14. The apparatus as recited in claim 1, wherein the watermark is placed in between at least two perforations in a line of perforations disposed parallel to a direction of travel of the film.

15. An apparatus for watermarking a film, the apparatus having at least one roller for routing the film through the apparatus, the apparatus comprising:

at least one light source for directing light toward a film to be watermarked;

a device for securing respective portions of a plurality of optical fibers proximal to the film, the device having at least a configurable portion that permits at least some of the respective portions of at least some of the plurality of optical fibers to shift relative to each other in a direction that is transverse to a longitudinal direction of the at least some of the respective portions in order to obtain varying watermark patterns, the plurality of optical fibers guiding light from the at least one light source to the film; and a controller for synchronizing an activation of the at least one light source with a rolling of the film performed by at least one of the at least one roller such that the light source is activated to record a watermark on the film to identify an aspect of the film, the watermark including a plurality of spots aligned transversely to a direction of film motion during printing of the film.

16. The apparatus as recited in claim 15, further comprising a plurality of the at least one light source that includes one of lasers and diodes.

17. The apparatus as recited in claim 15, wherein the at least one light source is one of a plurality of light sources that include color diodes, and colors of the diodes are employed as a feature of the watermark.

18. The apparatus as recited in claim 15, wherein the pattern identifies the aspect of the film.

19. The apparatus as recited in claim 15, wherein the aspect of the film includes one of an origin of the film and a maker of the film.

20. The apparatus as recited in claim 15, wherein the controller includes an encoder to synchronize a position of the film with the light sources.

21. The apparatus as recited in claim 15, wherein the control mechanism includes a shutter to activate the light sources.

22. A method for watermarking a film, comprising:

providing at least one light source and a plurality of optical fibers for directing light toward a film to be watermarked;

securing respective portions of the plurality of optical fibers proximal to the film using a securing device having at least a configurable portion that permits at least some of the respective portions of at least some of the plurality of optical fibers to shift relative to each other in a direction that is transverse to a longitudinal direction of the at least some of the respective portions in order to obtain varying watermark patterns on the film; and synchronizing, using a controller that is separate from at least one roller, an activation of the at least one light source with a rolling of the film performed by the at least one roller so that the light source is activated to record a watermark on the film to identify an aspect of the film, the watermark including a plurality of spots aligned transversely to a direction of film motion during printing of the film.

23. The method as recited in claim 22, further comprising identifying the aspect of the film by employing one or more of a pattern, colors of features in the pattern, and a position of the pattern on the film.

24. The method as recited in claim 23, wherein the identifying includes determining one of an origin of the film and an identity of a maker of the film.

25. The method as recited in claim 22, wherein the synchronizing includes synchronizing a position of the film with activation of the at least one light source in accordance with an encoder.

26. The method as recited in claim 22, wherein the synchronizing includes activating the at least one light source in accordance with a shutter.

27. The method as recited in claim 22, wherein the watermark is placed around a perforated area of the film.

* * * * *